United States Patent
Penzold et al.

(10) Patent No.: US 7,752,967 B2
(45) Date of Patent: Jul. 13, 2010

(54) ARRANGEMENT AND METHOD FOR SYNCHRONIZING PRINTING PRESSES AND ADDITIONAL COMPONENTS

(75) Inventors: Uwe Penzold, Poehl (DE); Raimond Posselt, Reichenbach (DE); Uwe Schaller, Treuen (DE)

(73) Assignee: MAN Roland Druckmaschinen AG, Augsburg (DE)

( * ) Notice: Subject to any disclaimer, the term of this patent is extended or adjusted under 35 U.S.C. 154(b) by 342 days.

(21) Appl. No.: 11/488,430

(22) Filed: Jul. 18, 2006

(65) Prior Publication Data

US 2007/0125249 A1 Jun. 7, 2007

(30) Foreign Application Priority Data

Jul. 19, 2005 (DE) ...................... 10 2005 033 574

(51) Int. Cl.
*B41F 33/00* (2006.01)
(52) U.S. Cl. ...................... 101/480; 101/216; 101/483
(58) Field of Classification Search ................ 101/216, 101/116, 480
See application file for complete search history.

(56) References Cited

U.S. PATENT DOCUMENTS

| | | | | |
|---|---|---|---|---|
| 4,839,814 A | * | 6/1989 | Steidel ...................... 700/122 |
| 5,615,609 A | * | 4/1997 | Hill et al. ...................... 101/183 |
| 5,676,055 A | * | 10/1997 | Schwinn et al. ............. 101/216 |
| 5,787,806 A | * | 8/1998 | Seyfried ...................... 101/181 |
| 5,878,665 A | * | 3/1999 | Muller ........................ 101/216 |
| 6,041,705 A | * | 3/2000 | Lintner ........................ 101/116 |
| 6,385,091 B1 | * | 5/2002 | Pekny ...................... 365/185.2 |
| 6,526,889 B2 | * | 3/2003 | Tokiwa ........................ 101/485 |
| 6,539,860 B2 | * | 4/2003 | Tsunashima et al. ........ 101/181 |
| 2002/0124743 A1 | * | 9/2002 | Sommer ..................... 101/183 |
| 2003/0191544 A1 | * | 10/2003 | Faulhammer et al. .......... 700/3 |
| 2006/0207450 A1 | * | 9/2006 | Buechner ................... 101/216 |
| 2009/0038491 A1 | * | 2/2009 | Rugamer ................... 101/219 |

FOREIGN PATENT DOCUMENTS

| | | |
|---|---|---|
| DE | 33 18 250 A1 | 11/1984 |
| DE | 41 27 321 A1 | 2/1993 |
| DE | 195 37 587 C2 | 4/1997 |
| DE | 197 02 963 A1 | 8/1997 |
| DE | 197 42 461 C2 | 4/1999 |
| DE | 103 17 570 B3 | 9/2004 |
| EP | 1 375 140 A2 | 1/2004 |
| EP | 1 541 350 A1 | 6/2005 |

* cited by examiner

*Primary Examiner*—Daniel J Colilla
(74) *Attorney, Agent, or Firm*—Crowell & Moring, LLP

(57) ABSTRACT

An arrangement for synchronizing printing presses and additional components, in which arrangement a printing press and/or an additional component form/forms a unit and are/is connected to further units, and the drives of the connected units are synchronized, the units having either AC drives and/or DC drives and being synchronized internally via synchronism regulators in the case of an AC drive and via at least one drive shaft in the case of a DC drive. For the synchronization of the units which are to be connected, at least one additional synchronism regulator is attached to at least one unit, all synchronism regulators of all units being connected to one another and being adapted to a setpoint value of the connected units.

13 Claims, 4 Drawing Sheets

ARRANGEMENT AND METHOD FOR SYNCHRONIZING PRINTING PRESSES AND ADDITIONAL COMPONENTS

This application claims the priority of German Patent Document No. 10 2005 033 574.8, filed Jul. 19, 2005, the disclosure of which is expressly incorporated by reference herein.

BACKGROUND AND SUMMARY OF THE INVENTION

The invention relates to an arrangement for synchronizing or regulating the synchronism of printing presses and additional components. Furthermore, the invention relates to a method for synchronizing printing presses and additional components.

The main drive components of printing presses and additional components of printing presses are usually operated with direct current motors (DC drives) or alternating current motors (AC drives). It is essential here that the synchronism is ensured of the printing presses and the additional components, such as printing unit or units, folding unit or units, web guide or guides, etc.

In printing presses having DC drives, the synchronism is usually achieved internally by mechanical synchronization. In order to produce this mechanical synchronization, diverse line shafts and stationary shafts are used which couple the printing-press components to one another. A plurality of printing-press systems are likewise coupled to one another mechanically. It is disadvantageous here that the mechanical coupling also leads to undesirable transmission of mechanical vibrations.

In order to increase the printing volume or the product diversity, it is the desire of many users in the field of the printing industry to expand the functional scope of the printing presses or to connect a plurality of printing presses to one another. As a result, for example, the following requirements are made of the manufacturers of printing presses.

Printing presses which already exist are to be supplemented by components, such as additional printing units, additional folding units, etc. Printing presses which already exist are to be connected to further printing presses or are to be coupled to the latter. Printing presses which already exist and are based on DC drive technology are to be supplemented by components or by printing presses which are based on AC drive technology, that is to say printing presses and/or additional components with different drive types are to be connected to one another.

At present, the expansion of printing presses is solved as follows: if a printing press is expanded by one or more additional components, the components which are to be added are coupled to the line shaft mechanically or physically. If large distances are to be bridged here, for example through a dryer system, the coupling is expensive. The problem of vibration coupling (feedback) of mechanical vibrations remains in the mechanical connection of the printing press and additional component or components.

If two or more printing presses are to be connected to one another, these have previously also been coupled mechanically via one or more shafts. Here, the associated transmission of vibrations in the connected unit of printing presses is the greatest problem. These vibrations can have a negative effect on the print quality. They are produced by the spring properties of the shaft connection and of the driven mass moments of inertia. The mechanical coupling can be made more difficult by differences of the line shafts with respect to rotational direction and height. In general, these conditions require a complicated and expensive mechanical adaptation.

If a printing press which already exists is to be supplemented by one or more components, the printing press and the components being based on different drive technologies, use is made of the method of coupling which is known by the name "real line shaft".

In the real line shaft, the coupling is realized via what is known as master/slave regulation. In this master/slave regulation, a sensor makes a setpoint signal available for the components which are to be added which have AC drive technology. Here, the old system part is the master and the new system part is the slave. The sensor detects the actual state of the system and the new system part is regulated according to this. The problems with this type of coupling are sufficiently known. A connection is set up which is similar to the mechanical coupling, as it were. The vibrations of the existing system are transmitted directly into the new system part. An external excitation of vibrations occurs, the effect of which reduces the print quality as seriously as stability problems when regulating which prevents operation.

The inventors have therefore set the object of making an arrangement and a method available, with which printing presses can be expanded inexpensively both with additional components and also with further printing presses and can be synchronized together, and the abovementioned problems of undesirable vibration coupling (feedback) are avoided in the process.

The inventors have discovered that, in printing presses having AC drives, the synchronism is achieved by what is known as a virtual line shaft, also called an electronic shaft. Here, the synchronism of the printing-press components is usually achieved electronically or partly also mechanically. The advantage of the electronic synchronization by means of a virtual line shaft/electronic shaft is that there is no direct mechanical feedback. An important feature of the virtual line shaft is that it makes the electronically generated setpoint values available. It synchronizes the drives. The basic principle of the virtual line shaft is based on the fact that every drive takes its setpoint values from this line shaft and is regulated according to this. This circumstance contributes substantially to improving the behaviour of printing presses and makes performance increases possible with a print quality which remains the same or is improved.

Furthermore, the inventors have discovered that the printing presses and expansion components can be decoupled in terms of vibrations with the aid of special synchronism regulation. The existing printing presses are equipped with an additional synchronism regulator. All synchronism regulators and the additional synchronism regulator are connected to one another. The virtual line shaft is formed in one of the synchronism regulators, depending on which system part is to assume the guidance function. All synchronism regulators operate with these generated setpoint values. Every system or component therefore operates for itself. Direct feedback, for example of vibrations, with the existing problems is therefore obviated.

This inventive concept can be used for the expansion with additional components in existing printing presses. The existing printing press and the additional component or components are equipped with an additional synchronism regulator for the expansion. The coupling takes place via the synchronism regulator, as has already been described.

Moreover, this method of coupling is also suitable in the expansion of printing presses with printing presses. The existing printing press is equipped with an additional synchronism regulator. The old and new components are connected with a virtual line shaft. The latter can be produced in different ways. Firstly, the virtual line shaft of the existing system can be transmitted by means of sensor emulation. In sensor emulation, the signal of a sensor is simulated electronically. This signal corresponds to the setpoint value of the system and is therefore available without mechanical coupling. The expenditure on change in the concept of the present solution is very low. The second method would be to connect the virtual line shaft directly. However, this requires the (synchronism) systems which are used to be compatible with one another.

Proceeding from the findings attained, the inventors provide an arrangement for synchronizing printing presses, to the extent that, for the synchronization of the units which are to be connected, at least one additional synchronism regulator is arranged on at least one unit and all synchronism regulators of the units are connected to one another.

As a result, a plurality of advantages are attained. For instance, the existing drive technology of the printing press, such as the motor and current regulation, can be retained. Moreover, mechanical decoupling and therefore an improved running property of the printing press are achieved. The invention provides simple coupling of existing printing-press systems, above all with DC drive technology. Furthermore, improved coupling is made possible for printing-press systems with AC drive technology. Costs can also be saved as a result of the inventive concept, as complicated mechanics, such as line shafts, are not necessary in the case of the printing presses being connected to printing presses or additional components. Advantages also result, however, with regard to safety requirements. The safety requirements can be implemented more cheaply as a result of the invention. In particular, the printing press or the printing-press system can be divided into separated risk regions.

It is advantageous if the additional synchronism regulator is arranged on the units which have DC drive technology.

In addition to the use of an additional synchronism regulator in the units which have DC drive technology, both the original unit and the unit which is to be connected can have in each case an additional synchronism regulator.

It is advantageous if at least one synchronism regulator forms a line shaft, the line shaft stipulating setpoint values for the other synchronism regulators. As a result, master/slave regulation of the connected units can be built up, in a similar manner to master/slave regulation with a real or physical line shaft, but the problems which occur there, such as regulation lag, are avoided.

In one particular embodiment, the synchronism regulator can have sensor emulation which simulates a signal of the sensor electronically. In this way, drive systems can be coupled which, for example, have only a corresponding sensor interface.

Furthermore, it is favorable if the synchronism regulator is integrated in the drive regulator. This embodiment is an inexpensive alternative.

Components of a printing press which have at least one AC and/or DC drive can be used as additional components. For example, the additional component can comprise at least one printing unit and/or one folding unit. Furthermore, the additional component can comprise at least one cooling unit and/or one web guiding unit.

In accordance with the arrangement, the inventors also provide a method for synchronizing printing presses and additional components, in which method a printing press and/or an additional component form/forms a unit and are/is connected to further units, and the drives of the connected units are synchronized, the units having either AC drives and/or DC drives and being synchronized internally via synchronism regulators in the case of an AC drive and via at least one drive shaft in the case of a DC drive. According to the invention, this method is improved to the extent that, for the synchronization of the units which are to be connected, electronic setpoint values are generated on at least one unit having at least one sensor, which setpoint values are fed to at least one additional synchronism regulator, and all synchronism regulators of the units are connected to one another and are adapted to these setpoint values.

Here, actual values can be detected by the sensor, for example the machine speed, which then generates corresponding setpoint values.

In the method, it is advantageous that, for synchronizing at least one synchronism regulator, a signal of a sensor is simulated electronically.

Furthermore, in the novel method, setpoint values for the other synchronism regulators are stipulated by at least one synchronism regulator, or sensor signals are simulated for other drive regulators.

BRIEF DESCRIPTION OF THE DRAWINGS

Preferred developments of the invention result from the following description. Exemplary embodiments of the invention will be explained in greater detail using the drawings, without being restricted thereto. In the drawings.

DETAILED DESCRIPTION OF THE DRAWINGS

In the following text, the present invention will be described in greater detail with reference to FIGS. 1 to 4.

Figure 1:
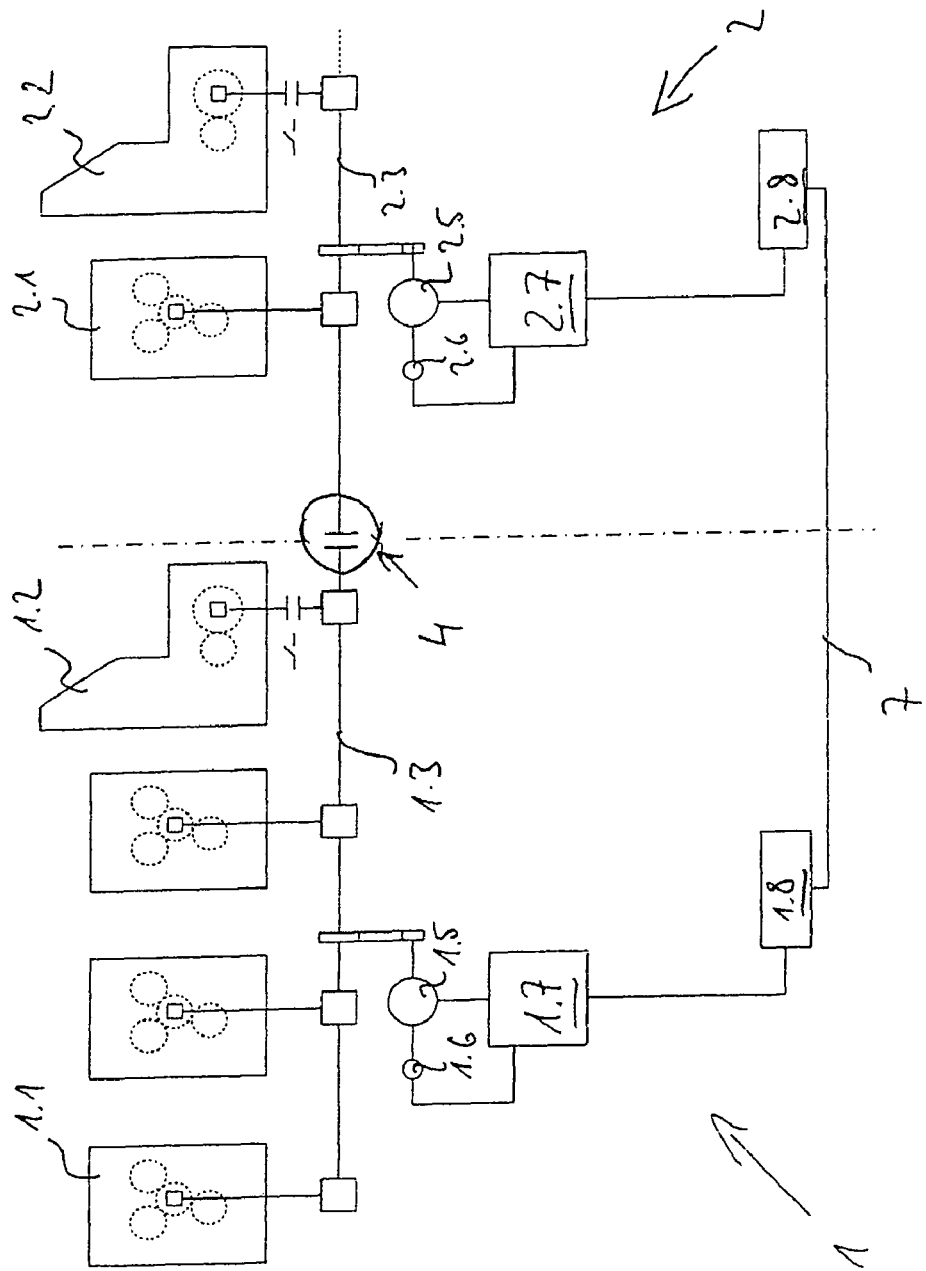
FIG. 1 shows a diagrammatic illustration of the known mechanical connection of two printing presses each having a DC drive.

FIG. 1 shows a diagrammatic illustration of a mechanical connection 4 which is known from the prior art of two printing presses 1 and 2 which each have DC drive technology. The first printing press 1 on the left in FIG. 1 has three printing units 1.1 and one folding unit 1.2. The printing units 1.1 and the folding unit 1.2 are driven by a drive shaft motor 1.5 via a common physical drive shaft 1.3. A sensor 1.6 determines the actual positional value of the drive shaft 1.3 on the motor 1.5. The drive shaft 1.3 and its rotational speed are set via a drive regulator 1.7 which receives data from the sensor 1.6 of the drive shaft motor, a PLC system 1.8 controlling the printing press 1. The drive and the control and the regulation of the second printing press on the right in FIG. 1 are constructed in an analogous manner to this, but the second printing press 2 has only one printing unit 2.1.

Figure 2:
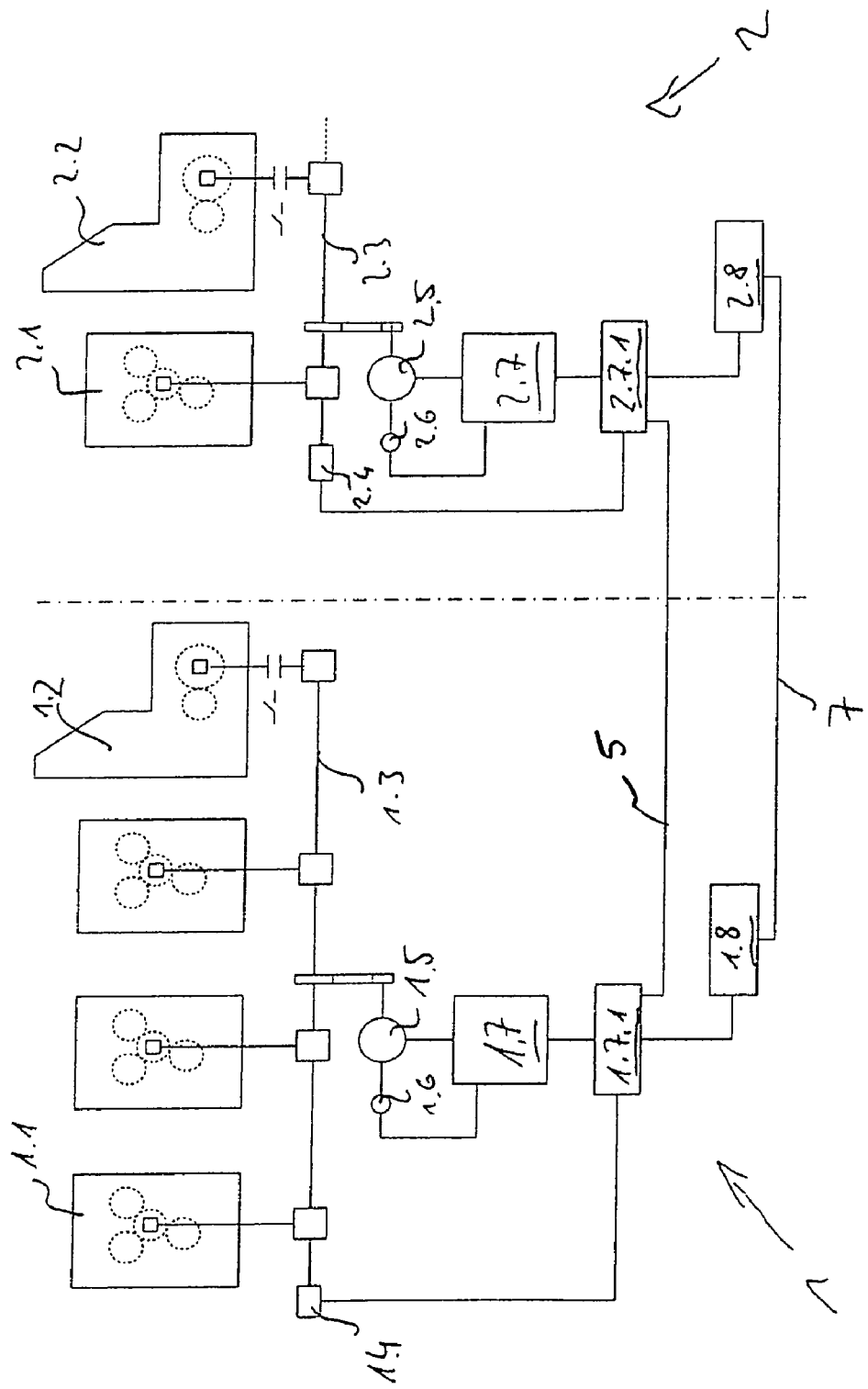
FIG. 2 shows a diagrammatic view of the novel connection of two printing presses having a DC drive.

In order then to couple the second printing press 2 to the first printing press 1 or vice versa and to synchronize both printing presses 1 and 2, the drive shaft 2.3 of the second printing press 2 is connected mechanically 4 to the drive shaft 1.3 of the first printing press 1. In an analogous manner to this, the two PLC systems 1.8 and 2.8 of both printing presses 1 and 2 are combined with one another via a connection 7. As explained in the introduction, unfavourable effects result from precisely this mechanical connection 4 of the two printing presses 1 and 2. For example, the mechanical connection can have a negative effect on the printed result with a possible associated vibration transmission from one printing press 1 or 2 to the other printing press 2 or 1. Furthermore, it is possible that the two printing presses 1 and 2 are situated either locally far from one another or are at an unfavourable angle with respect to one another, as a result of which a long path has to be bridged with the mechanical connection 4. Precisely in the event of an angled arrangement of the printing presses 1 and 2 with respect to one another, an angled physical shaft connection can be realized only with difficulty. This mechanical connection 4 can then only be executed expensively as a rule. FIG. 2 shows a possible embodiment of the inventive arrangement, with which an inexpensive connecting possibility is made available for printing presses, in which the vibration problems no longer occur.

FIG. 2 shows a diagrammatic illustration of the novel connection of two printing presses 1 and 2 which each have a DC drive. The respective construction of the first printing press 1 with three printing units 1.1 and the second printing press 2 with one printing unit 2.1 and their drives corresponds to the construction of the printing presses 1 and 2 from FIG. 1.

Instead of connecting the two drive shafts 1.3 and 2.3 to one another mechanically and, as a result, realizing the coupling of the two printing presses 1 and 2, each drive shaft 1.3 and 2.3 is equipped with an additional synchronism regulator 1.7.1 and 2.7.1 in this embodiment of the invention. These additional synchronism regulators 1.7.1 and 2.7.1 which detect information, such as rotational speed and actual positional value, etc., of the respective drive shaft 1.3 and 2.3 form a line shaft 5. This line shaft 5 which, as it were, replaces a real or a physical shaft connects the two printing presses 1 and 2, not mechanically but electrically. As a result, the coupled transmission of mechanical vibrations between printing presses 1 and 2 can be suppressed. Moreover, in the event of large connecting distances of the printing presses 1 and 2, a more inexpensive connecting method of the printing presses 1 and 2 is made possible, as the electrical connection is easier to realize than the mechanical connection.

Figure 3:
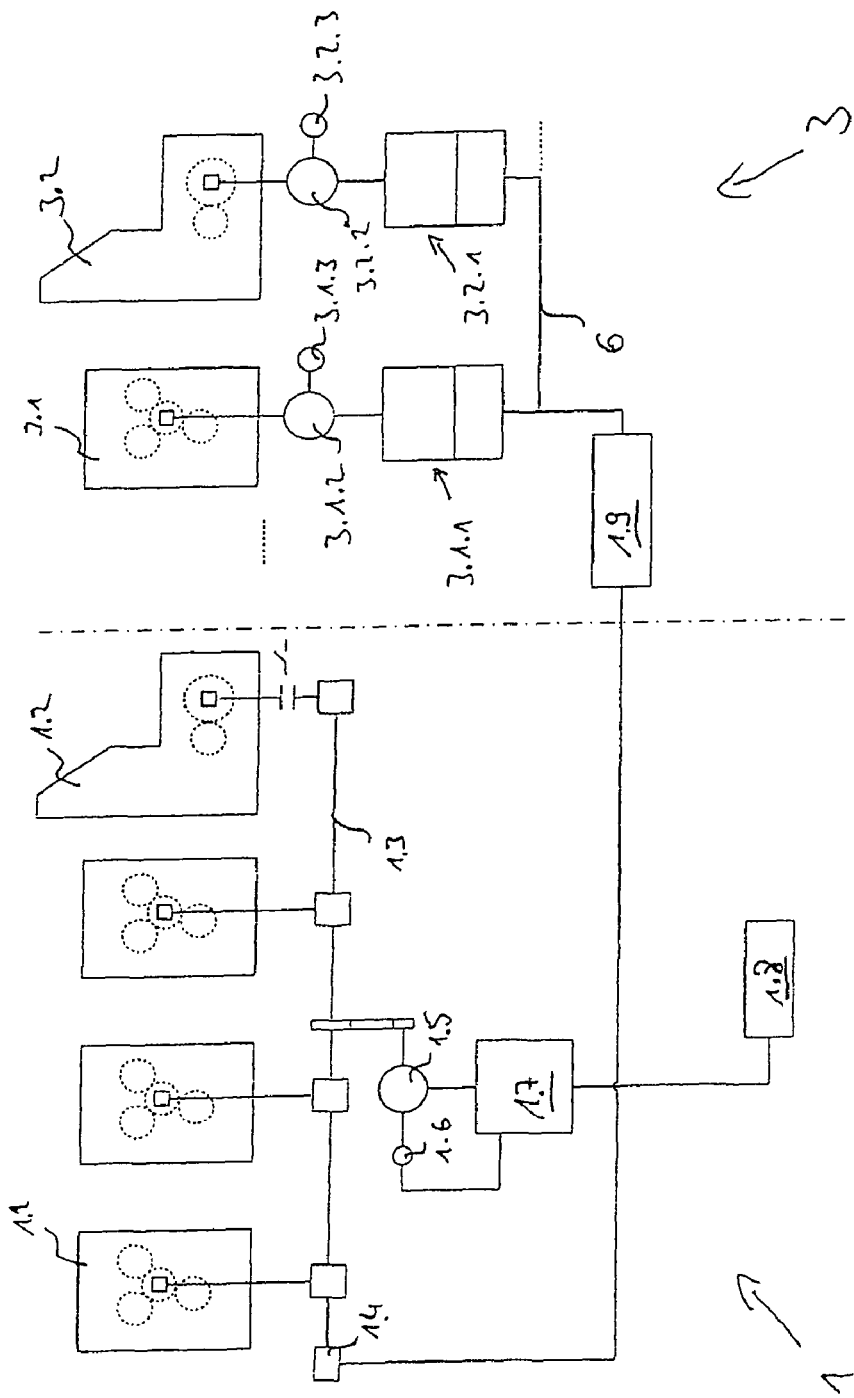
FIG. 3 shows a diagrammatic illustration of the known connection or expansion of a printing press having DC drive technology to/by additional components having AC drive technology.

FIG. 3 shows a diagrammatic illustration of the connection or expansion which is known from the prior art of a printing press 1 with DC drive technology to/by additional components 3 with AC drive technology. The printing press 1 on the left in FIG. 3 has three printing units 1.1 and one folding unit 1.2. The printing units 1.1 and the folding unit 1.2 are driven by a drive shaft motor 4.5 via a common drive shaft 1.3. In each case sensors 1.6 determine the actual value of the drive shaft 1.3 on the drive shaft 1.3. The drive shaft 1.3 and its rotational speed are set via a drive regulator 1.7 which receives data from the sensor 1.6 of the drive shaft motor, a PLC system 1.8 controlling the printing press 1. Here, the additional components are a printing unit 3.1 and a folding unit 3.2 which are not connected to one another by means of a drive shaft but in each case have an AC drive.

If the additional components 3 are to be attached to the printing press 1, this is realized as hitherto via master/slave regulation. In this master/slave regulation, the signal of the sensor 1.4 is used on the existing printing press 1 with DC drives at a suitable location. This signal of the sensor 1.4 is made available at 1.9 to the synchronism regulators 3.1.1 and 3.2.1 of the printing unit 3.1 and of the folding unit 3.2. Here, the old system part (printing press) is the master and the new system part (the additional components) is the slave. The sensor 1.4 detects the actual state of the printing press 1, and the additional components 3 are regulated for synchronization in accordance with this stipulated setpoint value. This known type of coupling is also associated with problems. As it were, a connection which is similar to mechanical coupling is built up. The vibrations of the existing system are transmitted directly into the new system parts. An external vibration excitation occurs, the effect of which reduces the print quality as seriously as stability problems when regulating which prevents operation.

Figure 4:
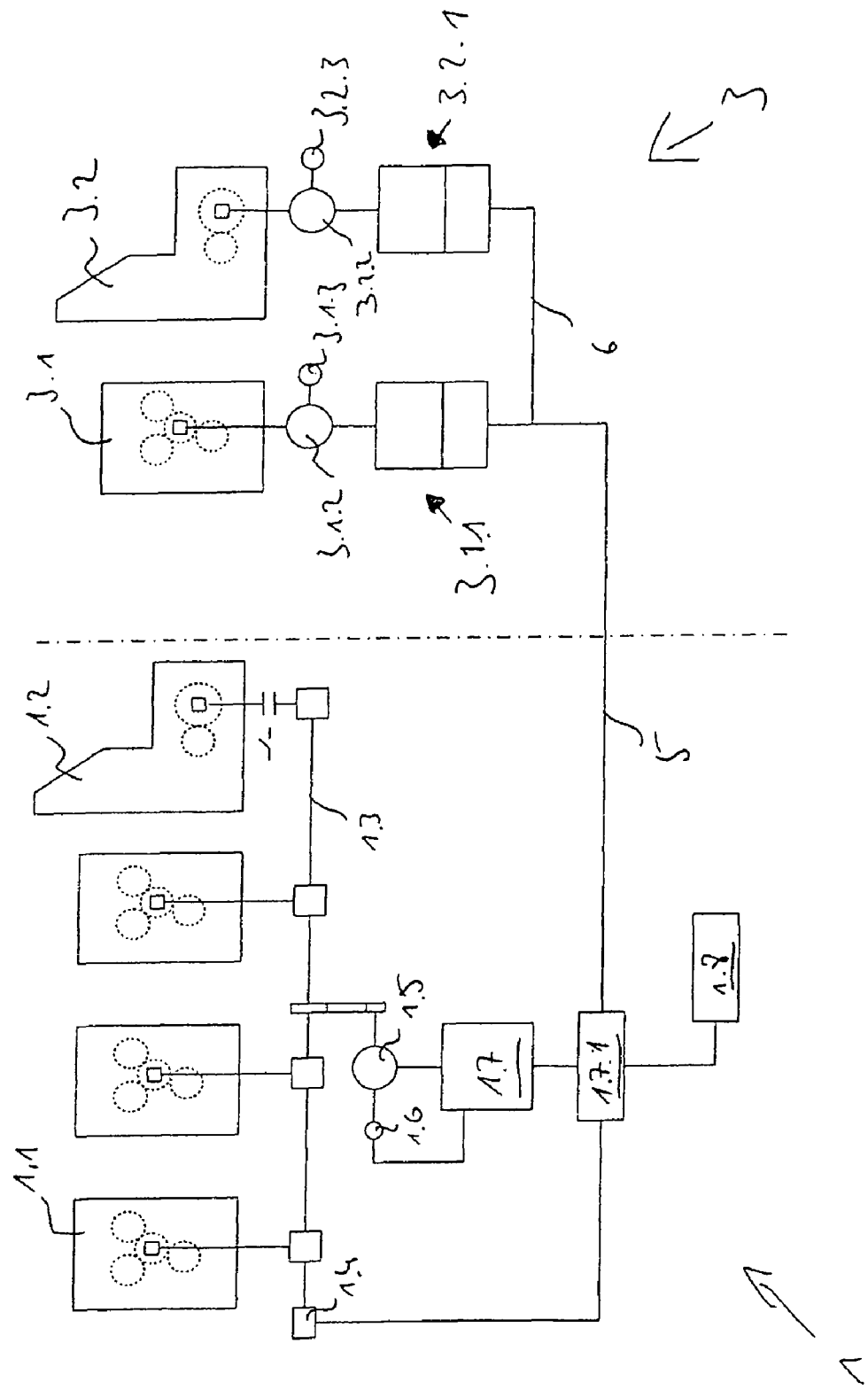
FIG. 4 shows a diagrammatic illustration of the novel connection or expansion of a printing press having DC drive technology to/by additional components having AC drive technology.

FIG. 4 shows a diagrammatic illustration of the novel connection or extension of the printing press 1 which has DC drive technology, to/by the additional components 3 which have AC drive technology.

As a result of the arrangement according to the invention and the method, printing presses can be expanded inexpensively both by additional components and also by further printing presses. Above all, the vibration coupling (feedback) which occurs in the previously used mechanical coupling method or via master/slave regulation is avoided here. In particular, the invention makes a simple connection possible of printing presses and/or additional components which have DC drive technology to printing presses and/or additional components which are equipped with AC drives.

It goes without saying that the above-named features and the features of the claims can be used not only in the combinations which are specified in each case, but also in other combinations or alone, without departing from the scope of the invention. Further, the foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 First printing press
1.1 Printing unit of the first printing press
1.2 Folding unit of the first printing press
1.3 Drive shaft of the first printing press
1.4 Sensor, actual positional value of the drive shaft
1.5 DC drive shaft motor of the first printing press
1.6 Sensor of the drive shaft motor of the first printing press
1.7 Drive regulator of the first printing press
1.7.1 Additional synchronism regulator of the first printing press
1.8 PLC of the first printing press
1.9 Sensor signal supplies setpoint value for real line shaft
2 Second printing press
2.1 Printing unit of the second printing press
2.2 Folding unit of the second printing press
2.3 Drive shaft of the second printing press
2.4 Sensor, actual positional value of the drive shaft
2.5 DC drive shaft motor of the second printing press
2.6 Sensor of the drive shaft motor of the second printing press
2.7 Drive regulator of the second printing press
2.7.1 Additional synchronism regulator of the second printing press
2.8 PLC of the second printing press
3 Additional components
3.1 Printing unit
3.1.1 Drive regulator of the printing unit with an integrated synchronism regulator
3.1.2 AC motor of the printing unit
3.1.3 Sensor of the printing unit motor
3.2 Folding unit 3.2.1 Drive regulator of the folding unit with an integrated synchronism regulator
3.2.2 AC motor of the folding unit
3.2.3 Sensor of the folding unit motor
4 Mechanical connection of the drive shafts of both printing presses
5 Line shaft of the synchronism regulators
6 Electronic shaft
7 Connection of the PLC of the printing presses

What is claimed is:

1. An arrangement for synchronizing printing presses and additional components, in which arrangement a printing press and/or an additional component form/forms a master unit and is connected to further units via a connecting line, and drives of the connected master and further units are synchronized to each other,
   the master unit having a DC drive with a drive regulator and the further units having either AC drives and/or DC drives with drive regulators,
   wherein the master unit is synchronized internally via at least one drive shaft and the further units are synchronized internally via synchronism regulators in a case of an AC drive and via at least one drive shaft in a case of a DC drive,
   wherein, for the synchronization of the connected master and further units to each other, at least one additional synchronism regulator is arranged into the connecting line on at least one unit and all synchronism regulators of all units are connected to one another,
   wherein the connecting line is an unbranched connecting line from the additional synchronism regulator to a connecting point thereof with the further units,
   wherein the master unit comprises a sensor for sensing an actual positional value of the drive shaft,
   wherein an output of said sensor is directly connected to an input of the additional synchronism regulator for electronically generating on the basis of output signals of said sensor setpoint values for regulating the drive of the master unit and the drives of the further units thereby providing a virtual line shaft,
   wherein said virtual line shaft is formed in the synchronism regulator of the master unit providing a guidance function, said synchronism regulator of the master unit being integrated in the drive regulator of said master unit, and
   wherein the virtual line shaft is transmitted to the synchronism regulators of the further units by a sensor emulation thereby simulating electronically the output of said sensor which corresponds to the setpoint values being available without mechanical coupling.

2. The arrangement for synchronizing printing presses according to claim 1, wherein the additional synchronism regulator is arranged on the units which have DC drives.

3. The arrangement for synchronizing printing presses according to claim 1, wherein both the master unit and the connected units have in each case an additional synchronism regulator.

4. The arrangement for synchronizing printing presses according to claim 1, wherein at least one synchronism regulator forms a line shaft, the line shaft stipulating setpoint values for the other synchronism regulators.

5. The arrangement for synchronizing printing presses according to claim 1, wherein at least one synchronism regulator has sensor emulation which simulates a signal of a sensor electronically.

6. The arrangement for synchronizing printing presses according to claim 1, wherein the synchronism regulator is integrated into a drive regulator.

7. The arrangement for synchronizing printing presses according to claim 1, wherein the additional components are components of a printing press which have at least one AC and/or DC drive.

8. The arrangement for synchronizing printing presses according to claim 7, wherein the additional components comprise at least one printing unit and/or one folding unit.

9. The arrangement for synchronizing printing presses according to claim 7, wherein the additional components comprise at least one cooling unit and/or one web guiding element.

10. A method for synchronizing printing presses and additional components, in which method a printing press and/or an additional component form/forms a master unit and are/is connected to further units via a connecting line, and drives of the connected master and further units are synchronized to each other,
   the master unit having a DC drive with a drive regulator and the further units having either AC drives and/or DC drives with drive regulators,
   wherein the master unit is synchronized internally via at least one drive shaft and the further units are synchronized internally via synchronism regulators in a case of an AC drive and via at least one drive shaft in a case of a DC drive,
   wherein the master unit comprises a sensor for sensing an actual positional value of the drive shaft of the master unit,
   wherein, for the synchronization of the connected master and further units, at least one additional synchronism regulator is arranged into the connecting line on at least one unit, and all synchronism regulators of the units are connected to one another,
   wherein the connecting line is an unbranched connecting line from the additional synchronism regulator to a connecting point thereof with the further units,
   wherein output signals of said sensor are directly fed to the additional synchronism regulator which electronically generates setpoint values on the basis of said output signals for regulating the drive of the master unit and the drives of the further units thereby providing a virtual line shaft, and
   wherein said virtual line shaft is formed in the synchronism regulator of the master unit providing a guidance function, said synchronism regulator of the master unit being integrated in the drive regulator of said master unit,
   comprising the step of regulating the drive of the master unit and the drives of the further units according to the setpoint values.

11. The method for synchronizing printing presses according to claim 10, wherein the setpoint values are generated on the units which have a DC drive.

12. The method for synchronizing printing presses according to claim 10, wherein a signal of a sensor is simulated electronically by at least one synchronism regulator.

13. The method for synchronizing printing presses according to claim 10, wherein at least one synchronism regulator stipulates setpoint values for the other synchronism regulators.

* * * * *